Nov. 7, 1967 F. G. HIBBITS ETAL 3,351,932

ANALOG DIGITAL CONVERTER

Filed July 23, 1964

INVENTORS

FORREST G. HIBBITS
PAUL M. HAAS

BY Richard K. Macneill
ATTORNEY

United States Patent Office 3,351,932

Patented Nov. 7, 1967

3,351,932

ANALOG DIGITAL CONVERTER

Forrest G. Hibbits, San Diego, and Paul M. Haas, Del Mar, Calif., assignors, by mesne assignments, to Honeywell Inc., Minneapolis, Minn., a corporation of Delaware

Filed July 23, 1964, Ser. No. 384,762

8 Claims. (Cl. 340—347)

ABSTRACT OF THE DISCLOSURE

An analog to digital converter is provided wherein the analog signal is supplied to an integrator circuit. A voltage controlled oscillator receives a signal from the integrator. A timing network provides control of a feedback signal which is summed with the analog signal at the input to the integrator.

The present invention relates to an analog to digital converter and more particularly to an analog to digital converter utilizing voltage to frequency conversion.

Prior art analog to digital converting utilizing voltage to frequency conversion have in general relied upon a network whereby the input voltage is summed in an integrator and applied to a threshold pulse forming circuit. The threshold pulse forming circuit yields a pulse when the input voltage reaches a certain predetermined threshold level. The output of the pulse forming circuit is then applied back to the input in a nulling feedback arrangement which cancels out a portion of the input voltage and partially discharges the integrating network. This type of system has inherent disadvantages, e.g. with no input potential there is no output frequency at all, allowing for no quiescent adjustment. A further disadvantage lies in the fact that this system cannot sense both a positive and negative input potential without the use of dual pulse generators, one for positive and one for negative input potentials, because of the thresholding principle.

According to the invention, an input analog voltage to be digitized is presented to the input of an integrating means the output of which is applied as a control voltage to a voltage controlled oscillator. In this application the term "voltage controlled oscillator" refers to a free-running oscillator having a frequency proportional to a voltage applied to a control input as opposed for example, to a triggered oscillator generating an output each time an input potential reaches a predetermined level. The voltage controlled oscillator will then have an output frequency dependent upon the input voltage, and will have a quiescent frequency when no voltage is applied to the input of the integrating means. This output is then utilized to trigger a precision flip-flop having precise bipolar voltage levels. The output of the precision flip-flop is then coupled back to the input of the integrating means for cancelling a portion of its input. It can be seen that since there is a zero input quiescent frequency of the voltage controlled oscillator, a built in sense frequency is present from which can be increased or decreased according to the polarity of the input voltage. Thus, either positive or negative voltages at the input can be digitized.

A further novel feature lies in the fact that a common time reference system controls both a reset pulse to the flip-flop and an enable pulse to a readout counter. This means that the ratio of feed back pulse width to readout counter enable time is fixed, thus cancelling out the effect of drift in the feed back pulse area due to change of the reset time.

It is an object of the present invention to provide an analog to digital converter which is capable of digitizing both positive and negative analog input signals.

A further object is the provision of an analog to digital converter which does not have a discontinuity as an input signal changes from positive to negative.

Another object of the present invention is to provide an analog to digital converter utilizing voltage to frequency conversion techniques.

Still another object of the invention is to provide an analog to digital converter which is simple, inexpensive and requires a minimum of maintenance and adjustment.

Other objects and many of the attendant advantages of the present invention will be more readily apparent with reference to the following detailed description taken in conjunction with the drawings in which like reference numerals designate like parts thereof and wherein.

Figure 1:
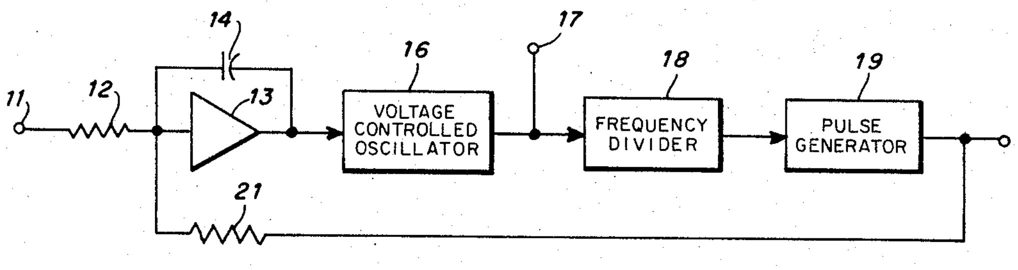
FIG. 1 is a block diagram of the basic system of the present invention.

Referring to FIG. 1, input terminal 11 is coupled through resistance 12 to integrator-amplifier 13. Integrator-amplifier 13 has an output coupled through integrator capacitor 14 back to its input, and an output connected to voltage controlled oscillator 16. The output of voltage controlled oscillator 16 is connected to output terminal 17 and frequency divider 18. The output of divider 18 is connected to pulse generator 19, the output of which is coupled through feed back resistance 21 to the input of integrator-amplifier 13.

Figure 2:
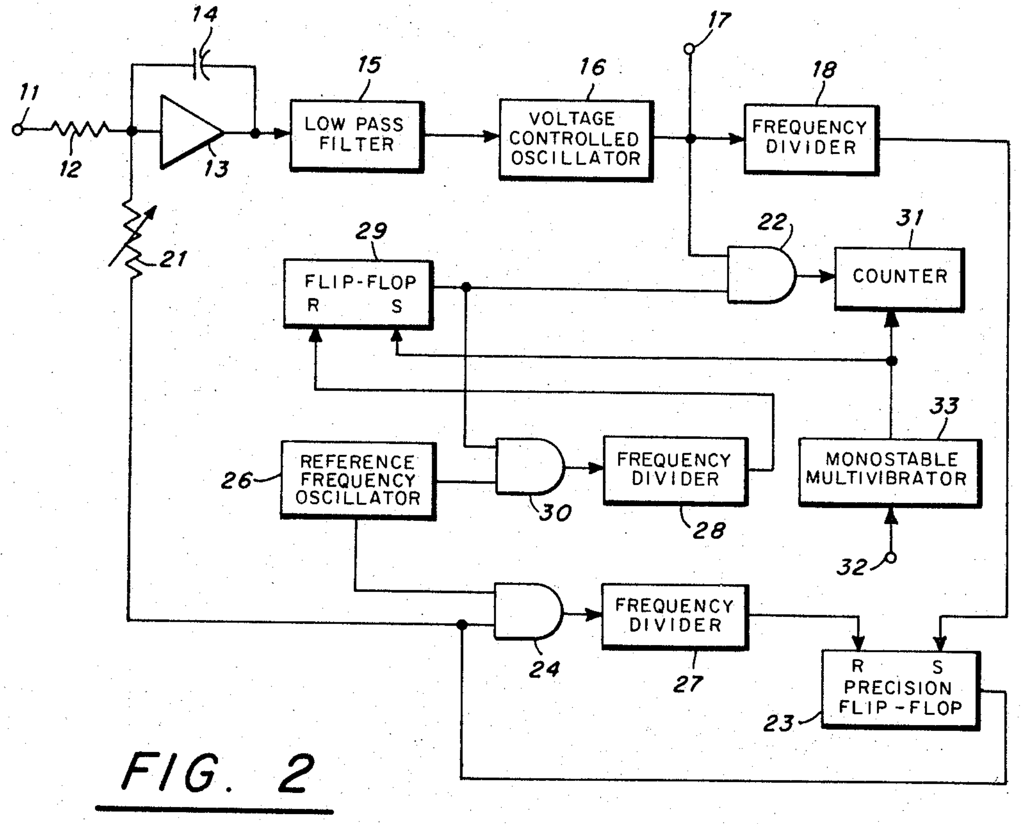
FIG. 2 is a more detailed block diagram of the preferred embodiment of the present invention.

Referring to FIG. 2, input terminal 11 is coupled through resistance 12 to the input of integrator-amplifier 13. The output of integrator-amplifier 13 is coupled back to its input through integrator capacitance 14, and to voltage controlled oscillator 16 via low pass filters 15. The output of voltage controlled oscillator 16 is connected to output terminal 17, the input of frequency divider 18, and the signal input of And gate 22.

The output of divider 18 is connected to a set input of precision flip-flop 23. The output of precision flip-flop 23 is coupled through variable resistance 21 to the input of integrator-amplifier 13, and to an enable input of And gate 24.

Reference-frequency oscillator 26 has one input connected to a signal input of And gate 24. The output of And gate 24 is connected to divider 27, the output of which is connected to a reset input of precision flip-flop 23.

Reference-frequency oscillator 26 has another output connected through And gate 30 to frequency divider 28. The output of divider 28 is connected to a reset input of flip-flop 29. The output of flip-flop 29 is connected to enable inputs of And gates 30 and 22. The output of And gate 22 is connected to counter 31.

Trigger input terminal 32 is connected to a trigger input of monostable multivibrator 33. The output of monostable multivibrator 33 is connected to a reset input of counter 31 and a set input of flip-flop 29.

*Operation*

Referring back to FIG. 1, an analog voltage applied at input terminal 11 is coupled to the input of integrator-amplifier 13 changing its output voltage in either a positive or negative direction. This output voltage is applied as a control voltage to voltage controlled oscillator 16. Voltage controlled oscillator 16 is free running and has an output frequency proportional to the potential at its input. This output frequency is divided down in divider 18 and utilized to trigger pulse generator 19. The output of pulse generator 19 is then a series of pulses at the same frequency as the output of divider 18, which is in turn proportional to the output frequency of voltage controlled oscillator 16.

The output of pulse generator 19 is a series of pulses having the same width regardless of frequency, i.e. a fixed volt-second area but a duty cycle which varies with frequency. These pulses are applied back to the input of integrator amplifier 13 through feedback resistance 21. The average voltage of this feedback input is of a polarity to subtract from the voltage applied at input terminal 11, and, hence, the output level of integrator amplifier 13 will soon reach a constant potential dependent upon the input analog voltage at input terminal 11. This potential is converted into frequency at output terminal 17, which is the output of voltage controlled oscillator 16.

Referring to FIG. 2, the network is identical to FIG. 1 up to the output of divider 18 which is applied as a set input to precision flip-flop 23. The output of precision flip-flop 23 is applied identically as the output of pulse generator 19 (FIG. 1) back to the input of integrator-amplifier 13 through variable resistance 21. Precision flip-flop 23 also provides an enable input to And gate 24 which then passes the output of reference-frequency oscillator 26 to divider 27. After a predetermined number of input cycles divider 27 yields a reset pulse to reset precision flip-flop 23. In this manner the ratio between the pulse width of precision flip-flop 23 and the period of oscillator 26 is accurately maintained. The voltage level of the pulses of precision flip-flop 23 is also accurately maintained for precise feedback at the input of integrator-amplifier 13, and is adjustable at variable resistance 21. A pulse from monostable multivibrator 33 is applied as a set input to flip-flop 29.

Another output of oscillator 26 is divided down in frequency in frequency divider 28 and applied as a reset pulse to flip-flop 29. The set output of flip-flop 29 will enable And gate 30 which then gates the output of reference-frequency oscillator 26 into divider 28. The set output of flip-flop 29 also will enable And gate 22. In this manner, the ratio between the period of oscillator 26 and the enabling period of And gate 22 is fixed.

Counter 31 counts the output cycles of voltage controlled oscillator 16 during the enabling period of And gate 22. This compensates for variations in frequency of reference-frequency oscillator 26 in that if reference-frequency oscillator 26 drifts, the reset pulse to precision flip-flop 23 from divider 27 will vary which, in turn, varies the feedback voltage to the input of integrator-amplifier 13 from precision flip-flop 23. Likewise, if oscillator 26 varies in frequency the enable time of And gate 22 will vary, thereby varying the period in which the output of voltage controlled oscillator 16 is applied to counter 31.

Reference-frequency oscillator 26 is normally a stable frequency oscillator such as a crystal controlled oscillator. However, under conditions in which an AC voltage is superimposed on the DC voltage to be measured, oscillator 26 may be made manually or automatically adjustable so as to cancel out the effects of the AC voltage. Such cancellation occurs when the interfering AC frequency is some integral multiple of the reciprocal of the time And gate 22 is enabled. A means for manually or automatically adjusting the frequency of oscillator 26 to maintain this relationship would be provided when cancellation of AC interfering voltages is desired. A unique feature of this invention is that such adjustments of the time And gate 22 is enabled, do not require any sort of recalibration of the system to maintain full accuracy, because the counter 31 timing means (divider 28) and the precision flip-flop 23 timing means (divider 27) have a common control means (reference oscillator 26).

When a readout is desired a trigger is supplied at trigger input terminal 32 which triggers monostable multivibrator 33, resetting counter 31 and setting flip-flop 29 to supply an enable pulse to And gate 30. At this time the output from reference-frequency oscillator 26 is passed through And gate 30 to divider 28 which supplies a reset pulse to flip-flop 29 after a predetermined number of counts, which inhibits And gate 30. Flip-flop 29 also supplies a pulse of predetermined width to enable And gate 22 to pass the output from voltage controlled oscillator 16 into counter 31. This completes one count or reading and the system is ready for the next readout trigger to be applied to trigger input terminal 32.

It should be understood, of course, that the foregoing disclosure relates to only a preferred embodiment of the invention and that it is intended to cover all changes and modifications of the invention herein chosen for the purposes of the disclosure which do not constitute departures from the spirit and scope of the invention.

We claim:

1. A voltage to frequency converter comprising:
(a) an integrating means having an input and an output;
(b) means for applying a voltage to be converted to said input of said integrating means;
(c) a voltage controlled oscillator having a control input coupled to the output of said integrating means;
(d) a triggered pulse generating means having a trigger input and an output, said trigger input coupled to said voltage controlled oscillator for producing pulses of a predetermined volt-second area in synchronism with said voltage controlled oscillator; and
(e) feedback means connected between said triggered pulse generating means output and said input of said integrating means for cancelling a portion of said voltage to be converted.

2. A voltage to frequency converter comprising:
(a) an integrating means having an input and an output;
(b) means for applying a voltage to be converted to said input of said integrating means;
(c) a voltage controlled oscillator having a control input and an output, said control input coupled to the output of said integrating means;
(d) a flip-flop having set and reset inputs and an output, said flip-flop set input coupled to said voltage controlled oscillator output;
(e) timing means having an input and an output for producing a pulse at its output a predetermined time after a pulse is applied at its input, said timing means input connected to said flip-flop output and said timing means output connected to said flip-flop reset input; and
(f) feedback means connected between said flip-flop output and said input of said integrating means for cancelling a portion of said voltage to be converted.

3. A voltage to frequency converter comprising:
(a) an integrating means having an input and an output;
(b) means for applying a voltage to be converted to said input of said integrating means;
(c) a voltage controlled oscillator having a control input and an output, said control input coupled to the output of said integrating means;
(d) a flip-flop having set and reset inputs and an output, said flip-flop set input coupled to said voltage controlled oscillator output;
(e) a coincidence means having a signal input, an enabling input, and an output, said enabling input connected to said flip-flop output;
(f) a reference-frequency oscillator having an output connected to said coincidence means signal input;
(g) a divider having an input and an output for producing an output after a predetermined number of pulses at its input, said divider input connected to said coincidence means output, and said divider output connected to said flip-flop reset input; and
(h) feedback means connected between said flip-flop output and said input of said integrating means for cancelling a portion of said voltage to be converted.

4. An analog to digital converter comprising:
(a) an integrating means having an input and an output;
(b) means for applying a voltage to be converted to said input of said integrating means;
(c) a voltage controlled oscillator having a control input and an output, said control input coupled to the output of said integrating means;
(d) a first flip-flop having set and reset inputs and an output, said flip-flop set input coupled to said voltage controlled oscillator output;
(e) first and second timing means each having an enabling input, a timing control signal input and an output, each of said first and second timing means operable when enabled to produce a pulse at its output after a predetermined number of pulses are applied at its timing control signal input;
(f) a control means having an output for producing a timing control signal, said control means output connected to said first and second timing means timing control signal input;
(g) said first timing means enabling input connected to said first flip-flop output and said first timing means output connected to said first flip-flop reset input;
(h) counting means having a signal input, a count timing input and reset input, said signal input connected to said voltage controlled oscillator output, said reset input adapted for connection to a start signal;
(i) a second flip-flop having set and reset inputs and an output, said set input adapted for connection to said a start signal, said reset input connected to said second timing means output, and said output connected to said second timing means enabling input and said counting means count timing input; and
(j) feedback means connected between said first flip-flop output and said input of said integrating means for cancelling a portion of said voltage to be converted.

5. An analog to digital converter comprising:
(a) an integrating means having an input and an output;
(b) means for applying a voltage to be converted to said input of said integrating means;
(c) a voltage controlled oscillator having a control input and an output, said control input coupled to the output of said integrating means;
(d) a triggered pulse generating means having a trigger input and an output, said trigger input coupled to said voltage controlled oscillator for producing pulses of a predetermined magnitude in synchronism with said voltage controlled oscillator;
(e) feedback means connected between said triggered pulse generating means output and said input of said integrating means for cancelling a portion of said voltage to be converted; and
(f) frequency measuring means connected to the output of said voltage controlled oscillator.

6. An analog to digital converter comprising:
(a) an integrating means having an input and an output;
(b) means for applying a voltage to be converted to said input of said integrating means;

(c) a voltage controlled oscillator having a control input and an output, said control input coupled to the output of said integrating means;
(d) a flip-flop having set and reset inputs and an output, said flip-flop set input coupled to said voltage controlled oscillator output;
(e) a first And gate having a signal input, an enabling input, and an output, said enabling input connected to said flip-flop output;
(f) a reference frequency oscillator having an output connected to said first And gate signal input;
(g) a first divider having an input and an output for producing an output after a predetermined number of pulses at its input, said first divider input connected to said first And gate output, and said first divider output connected to said flip-flop reset input;
(h) feedback means connected between said flip-flop output and said input of said integrating means for cancelling a portion of said voltage to be converted;
(i) a second And gate having a signal input, an enabling input, and an output, said signal input connected to said voltage controlled oscillator output;
(j) switch means;
(k) a second divider having an input and an output for producing an output signal after a predetermined number of pulses at its input, said second divider input coupled to said reference frequency oscillator output, and said second divider output selectively connected to said second And gate enabling input via said switch means; and
(l) frequency measuring means having an input connected to said second And gate output to detect the signals produced by said voltage controlled oscillator when said second divider output is connected to said second And gate enabling input.

7. In combination, integrator means, voltage controlled oscillator means connected to said integrator means, pulse generating means connected to said voltage controlled oscillator means for generating a pulse of fixed magnitude in response to signals produced by said voltage controlled oscillator means, and feedback means connected between said pulse generating means and said integrator means.

8. The combination recited in claim 7 wherein said integrator means includes amplifier means and an integrating means connected in parallel therewith, and a summing junction connected to the input of said amplifier and to said feedback means.

References Cited

UNITED STATES PATENTS

| | | | |
|---|---|---|---|
| 3,087,121 | 4/1963 | Bell | 331—11 |
| 3,201,781 | 5/1963 | Holland | 340—347 |
| 3,274,511 | 9/1966 | Dale et al. | 331—10 |

OTHER REFERENCES

A New Digital Voltmeter Having High Rejection of Hum and Noise, Hewlett-Packard Journal, vol. 13, No. 6, pp. 3–4, February 1962.

DARYL W. COOK, *Primary Examiner.*

A. L. NEWMAN, J. H. WALLACE, *Assistant Examiners.*